March 27, 1956 H. G. HAAS 2,740,084
VOLTAGE REGULATING SYSTEM
Filed Oct. 24, 1950
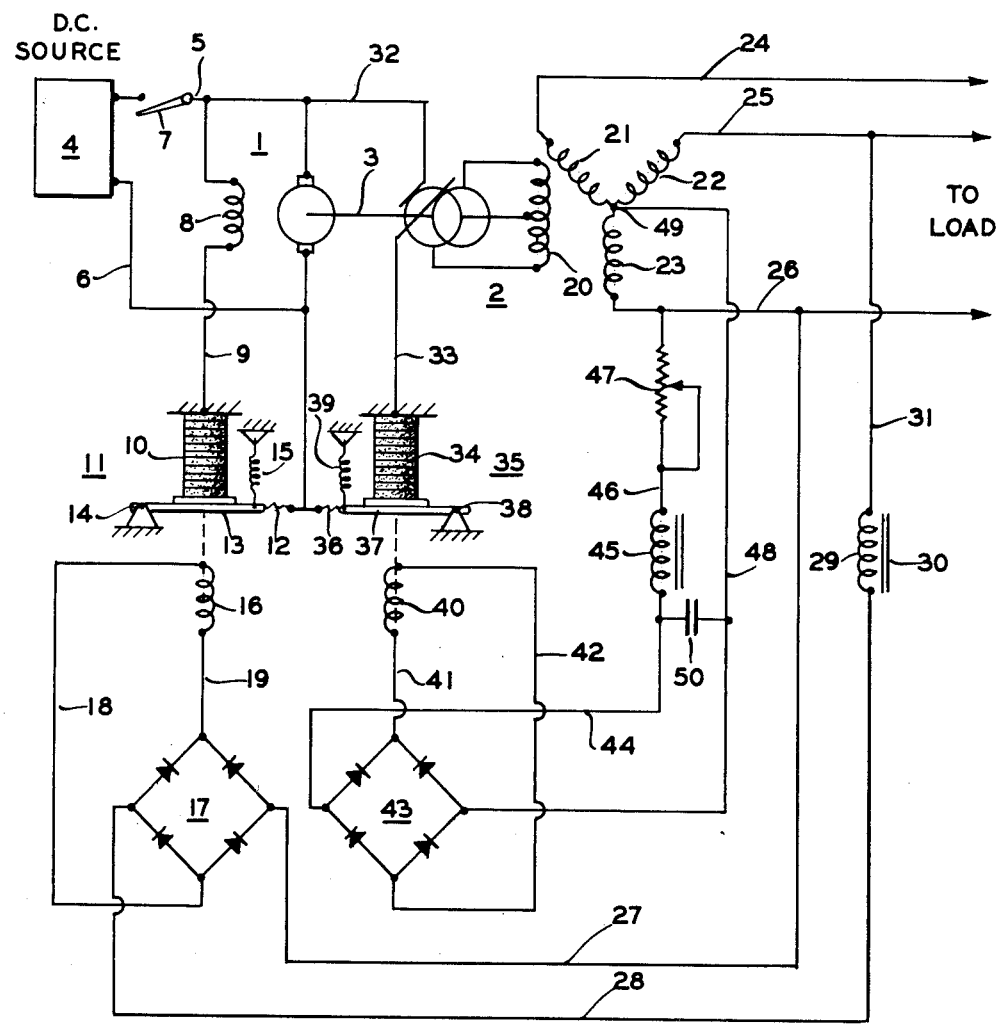
INVENTOR.
HAROLD G. HAAS
BY
ATTORNEY

United States Patent Office 2,740,084
Patented Mar. 27, 1956

2,740,084

VOLTAGE REGULATING SYSTEM

Harold G. Haas, Belleville, N. J., assignor to Bendix Aviation Corporation, Teterboro, N. J., a corporation of Delaware Application October 24, 1950, Serial No. 191,907

2 Claims. (Cl. 322—28)

The present invention relates to electrical regulating systems and more particularly to improvements in filter circuits in a voltage regulating system.

It has been found that alternating current generators do not produce an undistorted sine wave under all conditions of load and speed and that the harmonics generated will affect the accuracy of the voltage regulator. As an example, it has been noted that the third harmonics amplitude will increase with loading thus affecting the accuracy of the voltage regulator as the load increases. Regulators of the variable resistance type normally use a rectifier to supply D. C. to the control coil of the regulator. The rectifier works on the average values of input current, while the regulator is supposed to hold R. M. S. values. By providing a choke coil in series with the input to the rectifier and a capacitor connected across the input of the rectifier, the amplitude of the harmonics in the circuit are reduced to a value that will not affect the accuracy of the voltage regulator.

It is an object of the present invention to provide an improved voltage regulator.

Another object of the invention is to provide an improved voltage regulator that is not affected by harmonics in the load circuit.

Another object of the invention is to provide an improved filter circuit for a voltage regulator.

The above and other objects and features of the invention will appear more fully hereinafter from a consideration of the following description taken in connection with the accompanying drawing wherein one embodiment of the invention is illustrated by way of example.

The single figure of the drawing is a diagrammatic showing of a voltage and frequency regulating system embodying the invention.

Referring now to the drawing, there is indicated by the numeral 1, a motor which drives an A. C. generator or alternator 2 through a shaft 3. The motor is illustrated as a direct current motor deriving electrical energy from a suitable D. C. source and through conductors 5 and 6 and a switch member 7. The motor 1 has a shunt field 8 whose flux determines the speed of the motor 1. One end of the field 8 is connected to the conductor 5, while the opposite end of the field 8 is connected by a conductor 9 to one end of a variable resistance carbon pile element 10 of a regulator indicated generally by the numeral 11. The opposite end of the carbon pile 10 is connected by a conductor 12 to the conductor 6.

The carbon pile element 10 is included in the circuit of the shunt field winding 8 so as to vary the energizing current of the shunt field winding 8 and hence the speed of the motor 1. The speed of the motor 1 increases with a decrease in the excitation of the winding 8 and the speed decrease with an increase in the excitation thereof.

The regulator 11 may be of a type described and claimed in U. S. Patent No. 2,427,805, granted to William G. Neild. The regulator 11 is illustrated diagrammatically herein as including an armature 13 pivoted at 14 and biased by a spring 15 in a direction for decreasing the resistance of the carbon pile element 10. Opposing the spring 15 is an electromagnetic control winding 16. The winding 16 is connected across the output terminals of a rectifier 17 by conductors 18 and 19.

The A. C. generator 2 driven by the motor 1 through the shaft 3 is illustrated as having a rotating exciting field 20 and a three-phase stator comprising winding 21, 22 and 23. Output conductors 24, 25 and 26 lead from the stator windings 21, 22 and 23 to a suitable load (not shown). It is understood, however, that the A. C. generator 2 could be of a type having a stationary field and rotor armature winding, the rotating field type being shown by way of example and not as a limitation. Further, the generator may be single phase or multi-phase.

One input terminal of the rectifier 17 is connected by conductor 27 to output line 26. The other input terminal of the rectifier 17 is connected by conductor 28 to one end of a reactance winding 29 having an iron core 30. The opposite end of the winding 29 is connected by a conductor 31 to the output line 25. The impedance of the reactance winding 29 is equivalent to the resistance it replaces at the frequency which it is desired to maintain. Thus, current in the winding 16 decreases with an increase in frequency at a constant voltage across the lines 25 and 26. The latter action in turn causes adjustment of the carbon pile resistance 10 so as to vary the excitation of the motor winding 8 so as to maintain the desired constant motor speed. It is understood, however, that other frequency regulating means may be used.

The exciting winding 20 of the A. C. generator 2 has one end connected through conventional slip rings and conductor 32 to the conductor 5, while the opposite end is connected through conventional slip rings and conductor 33 to one end of a variable resistance carbon pile element 34 of a regulator indicated generally by the numeral 35. The opposite end of the carbon pile element 34 is connected by a conductor 36 to the conductor 6.

The carbon pile 34 is included in the circuit of the exciting winding 20 of the generator 2 so as to vary the exciting current and hence the output voltage from the generator 2. The output voltage from the generator 2 increases with increase in the excitation of the exciting winding 20 and decreases upon a decrease in the excitation thereof.

The regulator 35 may be of the type described in U. S. Patent No. 2,427,805, granted to William G. Neild. The regulator 35 is shown diagrammatically herein as including an armature 37 pivoted at 38 and biased by a spring 39 in a direction for decreasing the resistance of the carbon pile 35. Opposing the spring 39 is an electromagnetic control winding 40.

The winding 40 is connected by conductors 41 and 42 across the output terminals of a rectifier 43. One input terminal of the rectifier 43 is connected by a conductor 44 to one end of an inductance 45. The other end of the inductance 45 is connected by a conductor 46 to the output line 26. A variable resistor 47 is inserted in the conductor 46 to regulate the voltage setting of the coil 40. The other input terminal of the rectifier 43 is connected by a conductor 48 to the neutral point 49 of the stator windings 21, 22 and 23. A capacitor 50 is connected across the input terminals of the rectifier 43.

The inductance 45 and capacitor 50 form a filter circuit for the input of the rectifier 43 and are of a value to offer a low impedance to the fundamental frequency and a high impedance to the harmonics.

In operation, the filter circuit comprising the inductance 45 and capacitor 50 pass the fundamental frequency. Upon an increase in load, the amplitudes of the harmonics increase, however, they are effectively blocked by the filter circuit. By blocking out the harmonics from the rectifier 43, the output thereof will be substantially the same as the average of the R. M. S. values. Thus, the regulator will be working on the values which it is supposed to hold.

Although only one embodiment of the invention has been illustrated and described, various changes in the form and relative arrangement of the parts, which will now appear to those skilled in the art, may be made without departing from the scope of the invention.

What is claimed is:

1. A regulator for an alternating current generator supplying line current to a variable load and including an exciter field, comprising a variable resistor, an armature operatively connected thereto, a spring biasing the armature to tend to operate said resistor in the direction to produce an increase in the exciter field current, electromagnetic means tending to operate the armature in the opposite direction upon an increase of the regulated quantity, a circuit including a rectifier and a filter circuit for connecting said electromagnetic means to the generator output, said filter circuit comprising an inductance in series with the input of said rectifier and a capacitor across the input of said rectifier, said inductance and capacitor being proportioned so as to offer a low impedance to the fundamental frequency and a high impedance to the harmonics.

2. In combination, a multi-phase alternating generator for supplying line current to a variable load, regulating means for controlling the output of said machine, said regulating means including an electromagnetic control winding, a rectifier for energizing said control winding, means including an inductance for connecting one input terminal of said rectifier to one of said output lines, means for connecting the other input terminal of said rectifier to the neutral point of said multi-phase generator, and a capacitor connected across the imput terminals of said rectifier, said inductance and capacitor having a value to offer a low impedance to the fundamental frequency and a high impedance to the harmonic frequencies whereby said rectifier is not affected by load changes.

References Cited in the file of this patent

UNITED STATES PATENTS

| | | |
|---|---|---|
| 1,376,425 | Fortescue | May 3, 1921 |
| 1,857,174 | Zucker | May 10, 1932 |
| 2,482,482 | Harder et al. | Sept. 20, 1949 |
| 2,492,540 | Smith | Dec. 27, 1949 |